(12) United States Patent
Vohra et al.

(10) Patent No.: US 8,464,254 B1
(45) Date of Patent: Jun. 11, 2013

(54) TRACKING STORAGE OPERATIONS OF VIRTUAL MACHINES

(75) Inventors: Taher Mansur Vohra, Sunnyvale, CA (US); Matthew Conover, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 681 days.

(21) Appl. No.: 12/650,721

(22) Filed: Dec. 31, 2009

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 7,055,055 B1 * | 5/2006 | Schneider et al. | 714/6.1 |
| 7,093,086 B1 | 8/2006 | van Rietschote | |
| 7,370,164 B1 | 5/2008 | Nagarkar et al. | |
| 7,840,839 B2 * | 11/2010 | Scales et al. | 714/13 |
| 2009/0216970 A1 | 8/2009 | Basler et al. | |
| 2009/0313447 A1 | 12/2009 | Nguyen et al. | |
| 2010/0228913 A1 * | 9/2010 | Czezatke et al. | 711/112 |
| 2010/0262794 A1 | 10/2010 | De Beer et al. | |

* cited by examiner

*Primary Examiner* — Mengyao Zhe
(74) *Attorney, Agent, or Firm* — Meyertons, Hood, Kivlin, Kowert & Goetzel, P.C.; Dean M. Munyon; Paul T. Seegers

(57) ABSTRACT

Techniques relating to tracking storage operations performed by a guest virtual machine executing on a computer system are disclosed. The guest virtual machine may include a filter driver that provides an indication to a storage tracking virtual machine executing on the computer system that the guest virtual machine is performing a write operation to a production storage device. The storage tracking virtual machine then communicates information about the write operation to a backup storage device (e.g., one that provides continuous data production (CDP) to the computer system). In another embodiment, the storage tracking virtual machine may insert breakpoints into a guest virtual machine. When a first breakpoint triggers, the storage tracking virtual machine captures an I/O buffer of the guest virtual machine. After a second breakpoint triggers, the storage tracking virtual machine communicates information about the write operation to a backup storage device.

17 Claims, 12 Drawing Sheets

TRACKING STORAGE OPERATIONS OF VIRTUAL MACHINES

BACKGROUND

1. Technical Field

This disclosure relates generally to data storage systems and, more specifically, to a data storage system that tracks storage operations of virtual machines.

2. Description of the Related Art

Virtual machines are often employed because they allow a single computer system to emulate multiple physical computer systems that can implement different system platforms. Virtual machines also permit the sharing of a computer system's hardware resources among multiple virtual machines. Various software products, such as VMWARE'S ESX, have been developed to implement and manage virtual machines on computer systems.

Data storage systems are also being developed to preserve content produced by computer systems that execute virtual machines. Typically, data storage systems protect against the failure of individual storage devices by storing content in redundant storage systems. Various types of computer programs, including SYMANTEC'S NETBACKUP REAL-TIME product, may implement continuous data protection (CDP) functionality, in which changes to data content on a storage system are automatically logged in real time, permitting the state of the data at a given time to be reconstructed. In such systems, content generated by executing virtual machines may be recorded in real time.

Traditionally, backup systems that provide real-time backup support for virtual machines are inefficient. Proprietary software often is typically installed in each virtual machine in order for it to interact with the backup system, with this software is being tailored for the specific operating system of the virtual machine. Such systems may also utilize significant amounts of computer resources and are not easily scalable when executing large numbers of virtual machines with potentially different operating systems.

SUMMARY

In one embodiment, a computer-readable storage medium is disclosed having program instructions stored thereon that are executable by a computer system to cause the computer system to perform operations that include receiving, at a storage tracking virtual machine executing on the computer system, an indication that a guest virtual machine executing on the computer system is performing a write operation to a first storage device, wherein the indication is received via an inter-virtual machine communication interface. The operations further include communicating information about the write operation from the storage tracking virtual machine to a second storage device. In some embodiments, the communicated information includes a block of data being written by the write operation and metadata about the block.

In some embodiments, the operations further include initializing a filter driver in the guest virtual machine that is situated to receive write operations that are directed to the first storage device, where, in response to the write operation being performed, the filter driver conveys the indication received by the storage tracking virtual machine via a shared memory of the inter-virtual machine communication interface.

In some embodiments, the operations further include buffering, at the storage tracking virtual machine, information about the write operation and one or more other write operations being performed by one or more guest virtual machines executing on the computer system and communicating the buffered information from the storage tracking virtual machine to the second storage device in a single update. In some embodiments, the operations further include, prior to receiving the indication, inserting a plurality of breakpoints into the guest virtual machine.

In some embodiments, the received indication is that a first of the plurality of breakpoints has triggered in responsive to an initiation of the write operation. The operations further include, in response to the first breakpoint triggering, the storage tracking virtual machine capturing an I/O buffer of the guest virtual machine to obtain the information about the write operation.

In some embodiments, the operations further include the storage tracking virtual machine receiving an indication that a second of the plurality of breakpoints has triggered in response to a completion of the write operation and, in response the second breakpoint triggering, the storage tracking virtual machine communicating the information about the write operation to the second storage device.

In one embodiment, a method includes a storage tracking virtual machine executing on a computer system receiving tracking information about a write operation being performed to a first storage device, where the write operation is initiated by a guest virtual machine executing on the computer system. The method further includes the storage tracking virtual machine communicating the tracking information to a second storage device. In some embodiments, the tracking information includes a block of data being written and metadata about the block.

In some embodiments, the method further includes, in response to the guest virtual machine initiating the write operation, the storage tracking virtual machine stopping execution of the guest virtual machine and the storage tracking virtual machine receiving the tracking information by examining a predetermined portion of memory used by the guest virtual machine to perform the write operation.

In some embodiments, stopping execution includes causing an insertion of a breakpoint into a device driver that enables the guest virtual machine to perform write operations to the first storage device.

In some embodiments, a filter driver inserted into the guest virtual machine conveys the tracking information to the storage tracking virtual machine by storing the tracking information in a memory location that is accessible by both the guest virtual machine and the storage tracking virtual machine.

In some embodiments, the method further includes, prior to said communicating, the storage tracking virtual machine receiving an indication that the performance of the write operation has completed successfully and, in response to receiving the indication, the storage tracking virtual machine communicating the tracking information to the second storage device.

In some embodiments, the storage tracking virtual machine communicates the tracking information in a single update with tracking information about write operations being performed by a plurality of other guest virtual machines.

In one embodiment, a computer-readable storage medium is disclosed having program instructions stored thereon that are executable by a computer system to perform operations. The operations include instantiating a storage tracking virtual machine on the computer system, where, after instantiation of the storage tracking virtual machine, the storage tracking virtual machine includes a first set of program instructions executable by the computer system to receive a first indication that a guest virtual machine executing on the computer system is performing a write operation to a production storage device. The first set of program instructions is further executable by the computer system to store tracking information about the write operation to a backup storage device.

In some embodiments, the storage tracking virtual machine further includes program instructions executable to receive indications that one or more other guest virtual machines are performing write operations to the production storage, and where the guest virtual machine and the one or more other guest virtual machines implement different system platforms.

In some embodiments, the operations further include instantiating the guest virtual machine, where, after instantiation of the guest virtual machine, the guest virtual machine includes program instructions of a filter driver that are executable to provide the first indication via an inter-virtual machine communication interface. The program instructions of the filter driver are further executable to provide a second indication to the storage tracking virtual machine via the inter-virtual machine communication interface, where the second indication is that the write operation has completed. The storage tracking virtual machine further includes program instructions executable to store the information about the write operation to the backup storage device after receiving the second indication.

In some embodiments, the storage tracking virtual machine further includes program instructions executable to indicate, to the filter driver, that the storage tracking virtual machine has completed storing the information about the write operation to the backup storage device.

In some embodiments, the operations further include, in response to the guest virtual machine initiating the write operation, causing a hypervisor of the computer system to stop execution of the guest virtual machine and to initiate execution of the storage tracking virtual machine. The storage tracking virtual machine further includes program instructions executable to obtain the information about the write operation by accessing a predetermined memory location used by the guest virtual machine during performance of the write operation.

In some embodiments, the storage tracking virtual machine further includes program instructions to store the information about the write operation in a buffer with information about one or more other write operations, where the storage tracking virtual machine further includes program instructions executable to indicate in the buffer whether a given write operation has been completed by the production storage device.

DETAILED DESCRIPTION

Figure 1:
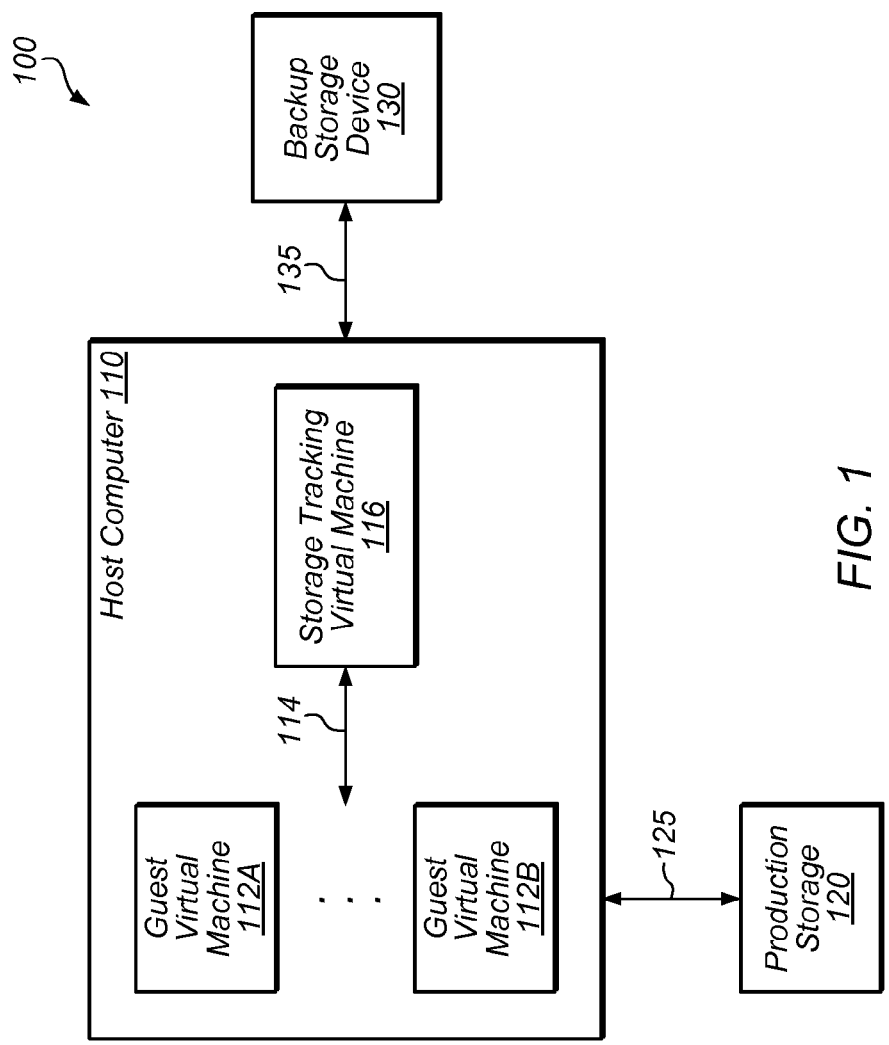
FIG. 1 is a block diagram illustrating one embodiment of a data storage system that includes a mechanism to track storage operations of virtual machines.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Causing a Computer System to Perform Operations." The execution of program instructions may be described or claimed as "causing a computer system to perform operations." The phrase is to be interpreted broadly, covering instructions that, when executed, perform the operations in questions, as well as instructions that install or instantiate code that, when executed, performs the operations.

"Virtual Machine." This term has its ordinary and accepted meaning in the art, which includes a software implementation of a computer system that executes program instructions like a physical machine. Virtual machines may be designed to run specific applications or implement entire system platforms with complete operating systems. In some instances, a single computer system may execute multiple virtual machines simultaneously using a virtual machine monitor to manage the virtual machines. In addition, a virtual machine may be under the control of virtual machine management software, which can initiate start/stop/suspend/resume operations of the virtual machine.

"System Platforms." This term has its ordinary and accepted meaning in the art, which includes the software framework and hardware architecture that allows software to execute. A system platform may include a computer's architecture, operating system, runtime libraries, programming languages, user interfaces, etc.

"Storage Device." This term has its ordinary and accepted meaning in the art, which includes a computing device that stores data written by a source computer system.

"Inter-Virtual Machine Communication Interface." As used herein, this term refers to an interface that enables the communication of information between virtual machines. Examples of such interfaces may include VMWARE'S VMSafe and/or VMCI API, MICROSOFT'S HYPERCALL API, etc.

"Filter Driver." As used herein, this term refers to a module/program that monitors information about operations being performed by a computer system. In one instance, a filter driver may monitor I/O operations performed by the computer system. For example, a filter driver may be resident between a computer system's file system and disk device driver, where it is able to monitor information passed between the file system and the driver. In embodiments described below, a "filter driver" may act as a "splitter" client, in that it sends information about write operations destined for a first storage device to a second storage device (e.g., for continuous data protection purposes).

"Breakpoint." This term has its ordinary and accepted meaning in the art, which includes an execution trigger that stops operation of a program at a particular point of execution.

Turning now to FIG. 1, one embodiment of a data storage system 100 is depicted. The present disclosure describes various embodiments of a host computer and a backup storage device within such a system. As will be described below, embodiments of the backup storage device may provide continuous data protection (CDP) to a host computer executing one or more guest virtual machines and a storage tracking virtual machine. The storage tracking virtual machine tracks write operations performed by the guest virtual machines to production storage, and communicates information about the write operations to the backup storage device. (As used herein, the term "production storage" is used to indicate one or more storage devices that include data—e.g., data written by one or more virtual machines).

In order to track these write operations, embodiments of the host computer may initialize a filter driver in each guest virtual machine that indicates to the storage tracking virtual machine when that guest virtual machine is performing a write operation. Alternatively, embodiments of the host computer may insert one or more breakpoints into a guest virtual machine (e.g., within the I/O path of the virtual machine), which trigger when that guest virtual machine performs a write operation. In this event, the storage tracking virtual machine may capture a predetermined portion of memory used by the guest virtual machine (e.g. the I/O buffer) to obtain the information about the write operation being performed, and communicate this information to the backup storage device.

As will be described below, these techniques, in some situations, can significantly improve system performance by reducing consumption of system resources (e.g., CPU cycles, memory, kernel objects, etc.) and by minimizing the number of write operations performed by the host computer to production storage and the backup storage device.

In the illustrated embodiment of FIG. 1, system 100 includes a host computer 110 that is coupled to a production storage 120 via interconnect 125 and coupled to backup storage device 130 via interconnect 135. In one embodiment, interconnects 125 and 135 are representative of one or more paths in a network such as a fiber channel (FC) network. Host computer 110 is configured to execute a plurality of guest virtual machines 112A and 112B and a storage tracking virtual machine 116. Host computer 110 is described further below with reference to FIG. 2. In one embodiment, guest virtual machines 112 and storage tracking virtual machine 116 may exchange information with one another via an inter-virtual machine communication interface 114.

Guest virtual machines 112, in one embodiment, perform write operations to production storage 120 via interconnect 125. As noted above, information about each of these write operations may be archived/backed up in backup storage device 130 so that the write operations stored in production storage 120 can be recreated in a subsequent restoration. In one embodiment, a guest virtual machine 112 includes a filter driver that indicates to storage tracking virtual machine 116 if the guest virtual machine is performing a write operation and that indicates once production storage 120 has completed the write operation. Embodiments of system 100 that track storage operations using a filter driver are described further below in conjunction with FIGS. 7, 9B, and 11. In some embodiments, the guest virtual machine 112 may indicate, to the storage tracking virtual machine 116, the data being written and any relevant metadata. In other embodiments, a guest virtual machine 112 includes a breakpoint that triggers to indicate, to storage tracking virtual machine 116, when the guest virtual machine 112 is performing a write operation and includes another breakpoint to trigger indicating that the production storage 120 has completed the operation. Embodiments of system 100 that track storage operations using breakpoints are described further below in conjunction with FIGS. 8, 9C, and 12.

Storage tracking virtual machine 116, in one embodiment, tracks write operations performed by guest virtual machines 112 to production storage 120. In one embodiment, storage tracking virtual machine 116 receives an indication that a guest virtual machine 112 is performing a write operation and communicates information about the write operation to backup storage device 130. In some embodiments, this indication is received from a filter driver of a guest virtual machine 112 via inter-virtual machine communication interface 114. As noted above, this indication may include the data being written and a corresponding set of metadata. In some embodiments, storage tracking virtual machine 116 receives an indication of a write operation by placing a breakpoint in a guest virtual machine 112 that triggers when that virtual machine 112 performs a write operation to production storage 120. At this breakpoint, the storage tracking virtual machine 116 may then examine the I/O buffer of that virtual machine 112 to obtain information about the write operation being performed. In various embodiments, storage tracking virtual machine 116 buffers information about multiple write operations and communicates the buffered information in a single update to backup storage device 130. As used herein, the term "single update" refers to communicating information about multiple write operation in one instance (as opposed to communicating with backup storage device 130 every time virtual machine 116 receives an update). In some embodiments, communicating information about multiple write operations in a single update may significantly reduce the number of write operations performed between host computer 110 and backup storage device 130.

Production storage 120, in one embodiment, is representative of one or more storage devices that are configured to process read and write operations generated by guest virtual machines 112. In some embodiments, production storage 120 may be arranged as a logical storage system in which physical storage devices are assigned logical unit numbers (LUNs) that correspond to respective logical storage units. A SAN architecture in which production storage 120 and/or backup storage device 130 may be included in one embodiment is described below in conjunction with FIG. 6. Production storage 120 is described further below in conjunction with FIG. 3.

Backup storage device 130, in one embodiment, is configured to maintain an archive/backup/other representation of write operations performed by guest virtual machines 112 to production storage 120. In one embodiment, backup storage device 130 provides real-time continuous data production (CDP) to host computer 110 such that each write operation performed by guest virtual machines 112 can be reproduced during a subsequent restoration of production storage 120. In some embodiments, the information stored by device 130 may include any data written to production storage 120 and various types of metadata including the size of the data being stored, the memory address of that data, the device within production storage 120 that stores that data, a time stamp of when the data was written, etc. Backup storage device 130 is described further below in conjunction with FIG. 4.

Figure 2:
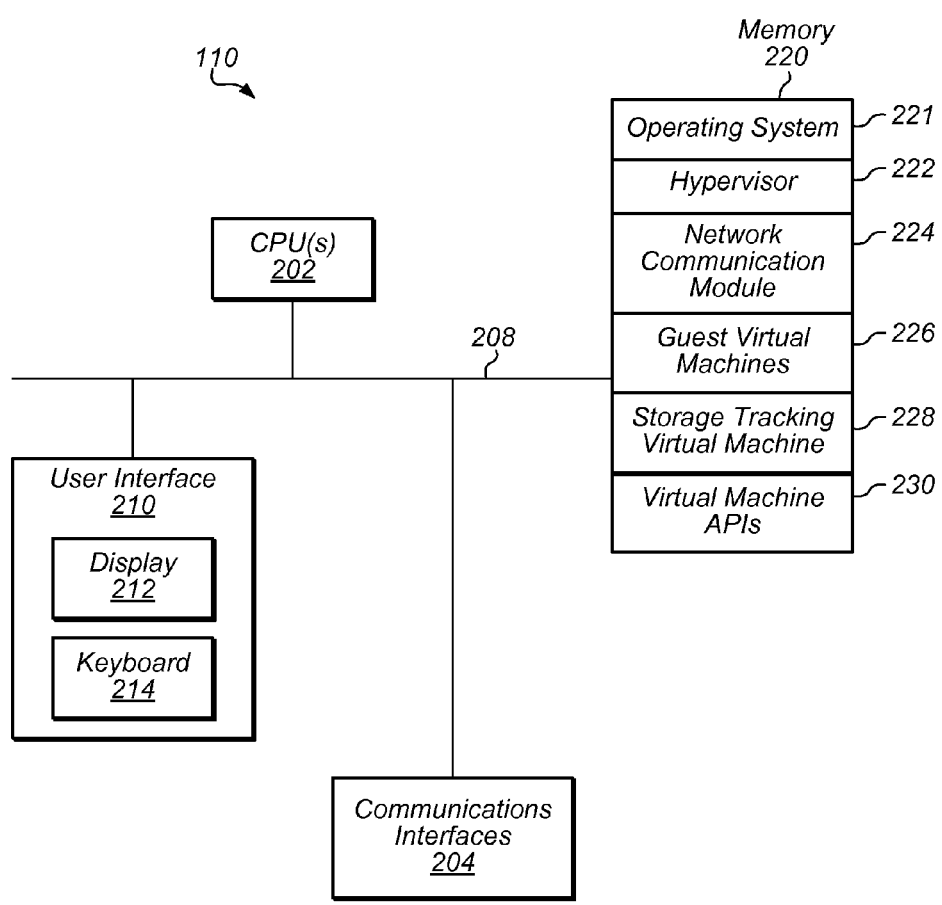
FIG. 2 is a block diagram illustrating one embodiment of a host computer system.

Turning now to FIG. 2, one embodiment of host computer 110 is depicted. As shown, in this embodiment, host computer 110 includes one or more processing units (CPUs) 202, one or more network or other communications interfaces 204, memory 220, and one or more communication buses 208 for interconnecting these components. The host computer 110 may include various user interface devices 210, for instance a display 212, a keyboard 214, etc.

Memory 220 may be considered to include any suitable type of memory within host computer 110. Memory 220 may include volatile memory (e.g., memory that is in use during operation of computer 110) and/or non-volatile memory. Thus, memory 220 may include RAM, ROM, magnetic storage, or any other suitable storage medium (e.g., an optical storage medium).

As shown, memory 220 may store various software modules and/or collections of data. Memory 220 may store an operating system (OS) 221 which is a "native" OS of host computer 110. Memory 220 may also store a hypervisor 222, which, in some embodiments, may be implemented within OS 221 or separately. As used herein, a "hypervisor" refers to a program that manages virtual machines running on a computer system. In various embodiments, hypervisor 222 could be implemented as VMWARE'S ESX SERVER, MICROSOFT'S HYPER-V, or any other suitable product. Memory 220 may also store information needed to implement one or more guest virtual machines 226 and one or more storage tracking machines 228. Properties of virtual machines 226 and 228 may be configured by hypervisor 222 in some embodiments.

Memory 220 also stores, in the embodiment shown, code that implements one or more APIs 230 usable by virtual machines running on host computer 110. Examples of such APIs may include, in various embodiments, VMWARE'S VMSAFE API, VMWARE'S VMCI API, etc. In certain embodiments, various ones of APIs may be used to facilitate inter-VM communication.

Still further, memory 220 may also include various other miscellaneous modules—for example, a network communication module (or instructions) 224 that is used for connecting the host computer 110 to other computers via the one or more communications interfaces 204 (wired or wireless), such as the Internet, other wide area networks, local area networks, metropolitan area networks, and so on.

Figure 3:
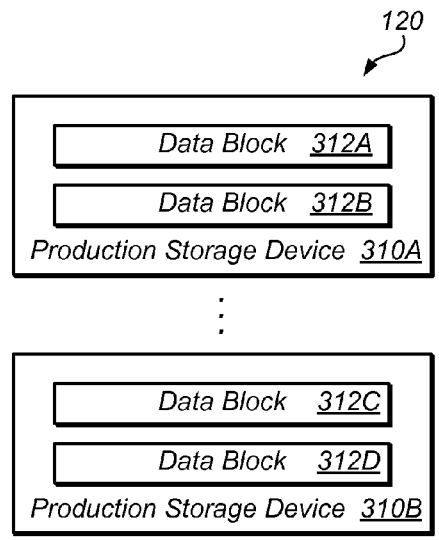
FIG. 3 is a block diagram illustrating one embodiment of a production storage.

Turning now to FIG. 3, one embodiment of production storage 120 is shown. In the illustrated embodiment, system 300 includes a plurality of production storage devices 310A and 310B where each device 310 stores a plurality of data blocks 312A-D written by guest virtual storage machines 112. In one embodiment, production storage 120 may allocate separate portions of memory for different guest virtual machines 112, where the data blocks for a given virtual machine 112 may be isolated from the data blocks of another virtual machine 112. That way, in some embodiments, one guest virtual machine 112 may not be able to access the data blocks of another virtual machine 112. In other embodiments, data blocks of different virtual machines 112 may be interspersed within production storage 120. In some embodiments, production storage system 300 may be implemented such that each storage device 310 is addressable by a corresponding logical unit number (LUN).

Figure 4:
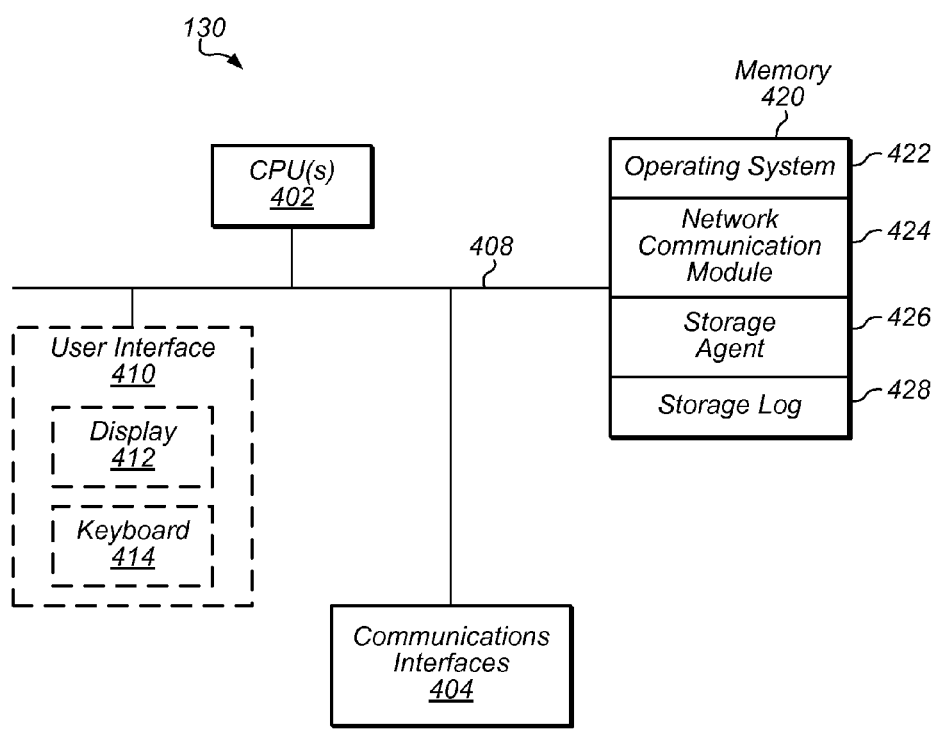
FIG. 4 is a block diagram illustrating one embodiment of a backup storage device.

Turning now to FIG. 4, one embodiment of a system for implementing backup storage device 130 is depicted. As shown, backup storage device 130 includes one or more processing units (CPUs) 402, one or more network or other communications interfaces 404, memory 420, and one or more communication buses 408 for interconnecting these components. In some embodiments, backup storage device 130 may include user interface devices 410, for instance a display 412 and a keyboard 414. [Note: the fact that certain items are shown with a solid as opposed to a dotted line does not mean that the items are required in all possible embodiments.]

Memory 420 may be considered to include any suitable type of memory within backup storage device 130. Memory 420 may include volatile memory (e.g., memory that is in use during operation of backup storage device 130) and/or non-volatile memory. Thus, memory 420 may include RAM, ROM, magnetic storage, or any other suitable storage medium (e.g., an optical storage medium).

As shown, memory 420 may store various software modules and/or collections of data. Memory 420 may store an operating system (OS) 422 that manages the operation of backup storage device 130. Memory 420 may also store a storage agent 426 that archives/backs up information provided by host computer 110 and that services requests for data during a restoration of production storage 120. Memory 420 may also include a storage log 428 that stores backup information—e.g., information about write operations performed by guest virtual machines 112.

Memory 420 may also include various other miscellaneous modules—for example, a network communication module (or instructions) 424 that is used for connecting the backup storage device 130 to other devices via the one or more communications interfaces 204 (wired or wireless), such as the Internet, other wide area networks, local area networks, metropolitan area networks, and so on.

Figure 5:
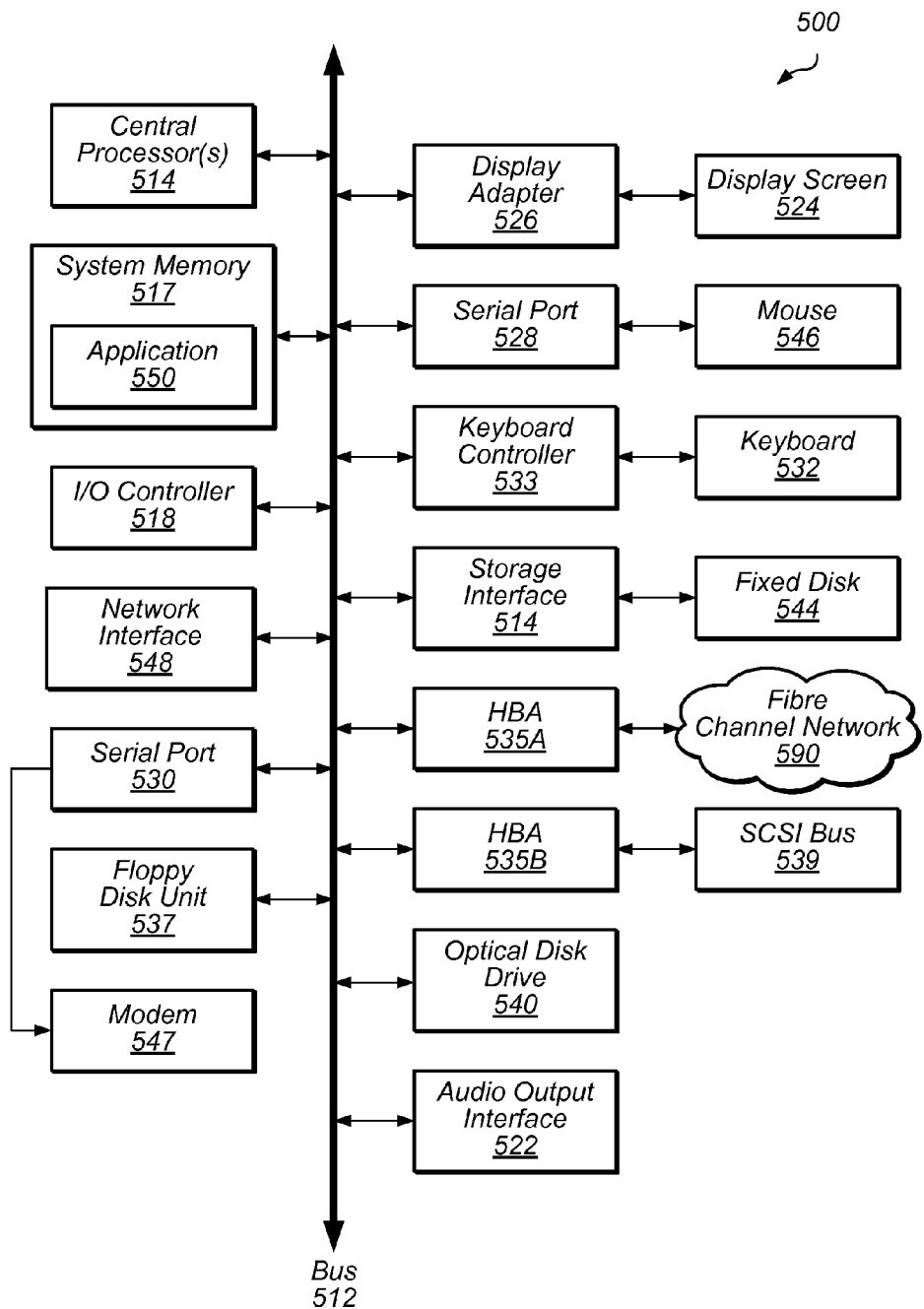
FIG. 5 is a block diagram illustrating one embodiment of a representative computer system for implementing a host computer or a backup storage device.

Turning now to FIG. 5, a block diagram of one embodiment of a computer system 500 used to implement host computer 110 or backup storage device 130 is depicted. Computer system 500 includes a bus 512 which interconnects major subsystems of computer system 500, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 500 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548. System memory 517 may comprise program instructions (such as application 550) to implement various techniques described below.

Storage interface 514, as with the other storage interfaces of computer system 500, can connect to a standard computer readable medium for storage and/or retrieval of information, such as a fixed disk drive 544. Fixed disk drive 544 may be a part of computer system 500 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present disclosure. The devices and subsystems can be interconnected in different ways from that shown in FIG. 5. The operation of a computer system such as that shown in FIG. 5 is readily known in the art and is not discussed in detail in this application. Code to implement the present disclosure can be stored in computer-readable storage media such as one or more of system memory 517, fixed disk 544, optical disk, or floppy disk. The operating system provided on computer system 500 may be MS-DOS, MS-WINDOWS, OS/2, UNIX, LINUX, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
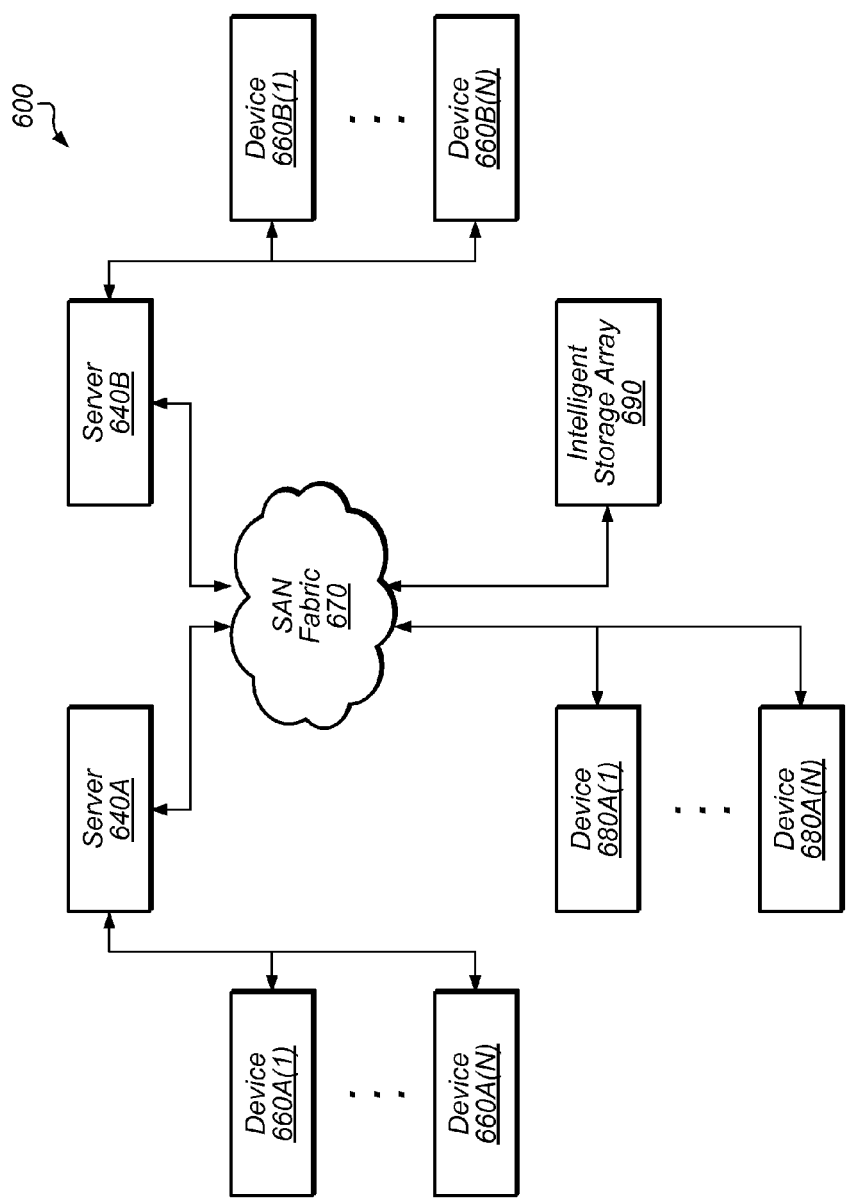
FIG. 6 is a block diagram illustrating one embodiment of a storage area network.

Turning now to FIG. 6, a block diagram illustrating one embodiment of a network architecture 600 is depicted. Such an architecture may include, for example, production storage 120 and/or backup storage device 130 in various embodiments. In one embodiment, various blocks such as storage servers 640A and 640B can be implemented using computer systems similar to computer system 500 discussed above. Storage server 640A is depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required in all embodiments. In some embodiments, various other types of networks, such as Ethernet networks may be used in place of SAN fabric 670. In one embodiment, SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670. In various embodiments, various components or network architecture 600 may be implemented as part of a cloud-computing platform. As noted above, production storage devices 120 and backup storage device 130 may be included within a SAN in one embodiment.

Figure 7:
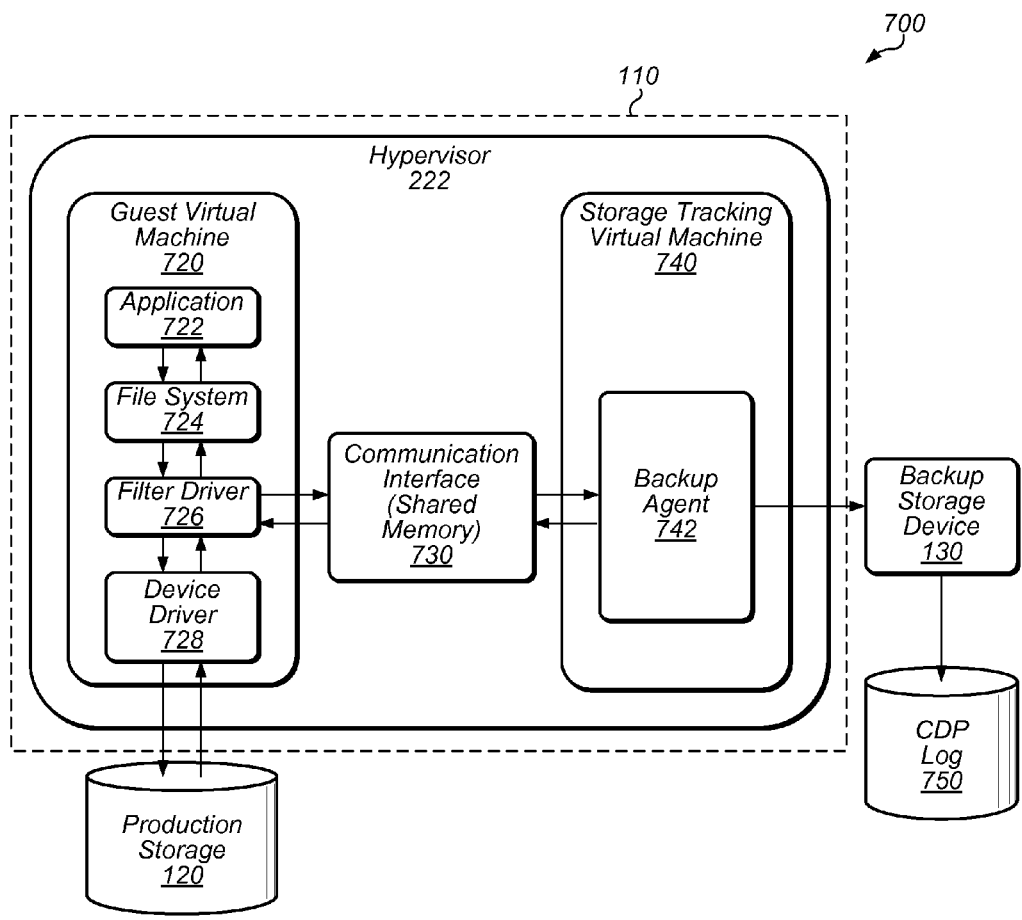
FIG. 7 is a block diagram illustrating one embodiment of a system that tracks storage operations using a filter driver.

Turning now to FIG. 7, a block diagram illustrating one embodiment of a system 700 that tracks storage operations using a filter driver is depicted. As shown, system 700 includes host computer 110, production storage 120, and backup storage device 130. Host computer 110 is configured to execute a hypervisor 222, a guest virtual machine 720, and a storage tracking virtual machine 740. In some embodiments, host computer 110 may execute additional guest virtual machines 720, each of which might be executing a different guest operating system. In the embodiment shown, hypervisor 222 includes an inter-virtual machine communication interface 730. Guest virtual machine 720 includes an application 722, file system 724, filter driver 724, and device driver 728. Storage tracking virtual machine 740 includes a backup agent 742. In one embodiment, backup storage device 130 is coupled to a continuous data protection (CDP) log 750. Many variations to system 700 will be apparent to those skilled in the art.

In the illustrated embodiment, application 722 writes information to production storage 120; this information is archived/backed up in backup storage device 130. (The arrows shown in FIG. 7 illustrate the flow of information between blocks within an I/O path of system 700.) In the embodiment shown, application 722 writes data to file system 724. For example, application 722 may modify a particular file within a directory of file system 724. The file system 724 then provides information about the write operation to device driver 728 via filter driver 726. In one embodiment, device driver 728 communicates information about the write operation to production storage 120. For example, device driver 728 may be a SCSI device driver that provides instructions to one or more production storage devices 310 to write the data to specific storage/block locations. Once production storage 120 has completed the write operation, production storage 120 may provide a corresponding indication, to device driver 728, indicating that it has completed the write operation. Device driver 728, in turn, may provide the indication to file system 724 via filter driver 726. File system 724 may then indicate whether the write operation was successful to application 722.

In one embodiment, the I/O path of guest virtual machine 720 (i.e., the path between blocks 722, 724, and 728) is modified by inserting a module/instructions for a filter driver 726 that is executable to provide information, to backup agent 742, that is used by agent 742 to track the performance of write operations to production storage 120. In some embodiments, a filter driver 726 is initialized automatically in the guest virtual machine 720 by an operating system during boot of the machine 720. In various embodiments, filter driver 726 provides a first indication that guest virtual machine 720 is performing a write operation when information about the write operation passes through the filter driver 726 from the file system 724 to the device driver 728. In some embodiments, the indication includes the data being written and a set of corresponding metadata such as described above in FIG. 1. In the illustrated embodiment, filter driver 726 stores the indication in a shared memory that is accessible by driver 726 and by backup agent 742 via interface 730. In various embodiments, filter driver 726 may communicate the indication using any types of guest-to-guest communication such VMWARE'S VMCI, MICROSOFT'S HYPERCALLS, etc.

In some embodiments, filter driver 726 also provides a second indication, to backup agent 742, that the production storage 120 has completed the write operation. In one embodiment, filter driver 726 provides this information to agent 742, when device driver 728 passes an indication of the successful write operation completion through filter driver 726 to file system 724. In some embodiments, filter driver 726 may provide this second indication in a similar manner as the first indication—i.e., via interface 730. In one embodiment, backup agent 742 buffers information about the write operation and does not communicate it to backup storage device 130 until it receives the second indication. (In this manner, backup storage device 130 may be made consistent with production storage 120 such that 130 does not include information about an unsuccessful write operation.) In one embodiment, backup agent 742 communicates information about the write operation to backup storage device 130 upon receipt of the second indication, allowing backup storage device 130, in turn, to store information about the write operation in CDP log 750. In other embodiments, backup agent 742 may wait and subsequently communicate information about multiple completed write operations in a single update to backup storage device 130. For example, backup agent 742 may batch this information at regular time intervals, after a predetermined number of write operations have completed, once a buffer storing this information exceeds a specified capacity, etc. In various embodiments, backup agent 742 may provide filter driver 726 with a confirmation, once agent 742 has communicated information for one or more write operations to device 130. Filter driver 726 may then forward the indication of the write operation completion from device driver 728 to file system 724 in response to receiving agent 742's confirmation.

By using a filter driver 726 to communicate with backup agent 742 via interface 730, embodiments of system 700 may, in some instances, provide certain advantages. For example, the use of a storage tracking virtual machine (e.g., 740) means that guest virtual machines 720 do not need to include functionality (e.g., a driver) for communicating information about write operations to backup storage device 130. Thus, guest virtual machines 720 may execute more efficiently, particularly in instances in which filter driver 726 is relatively lightweight.

System 700 is described in more detail below in conjunction with FIGS. 9B and 11.

Figure 8:
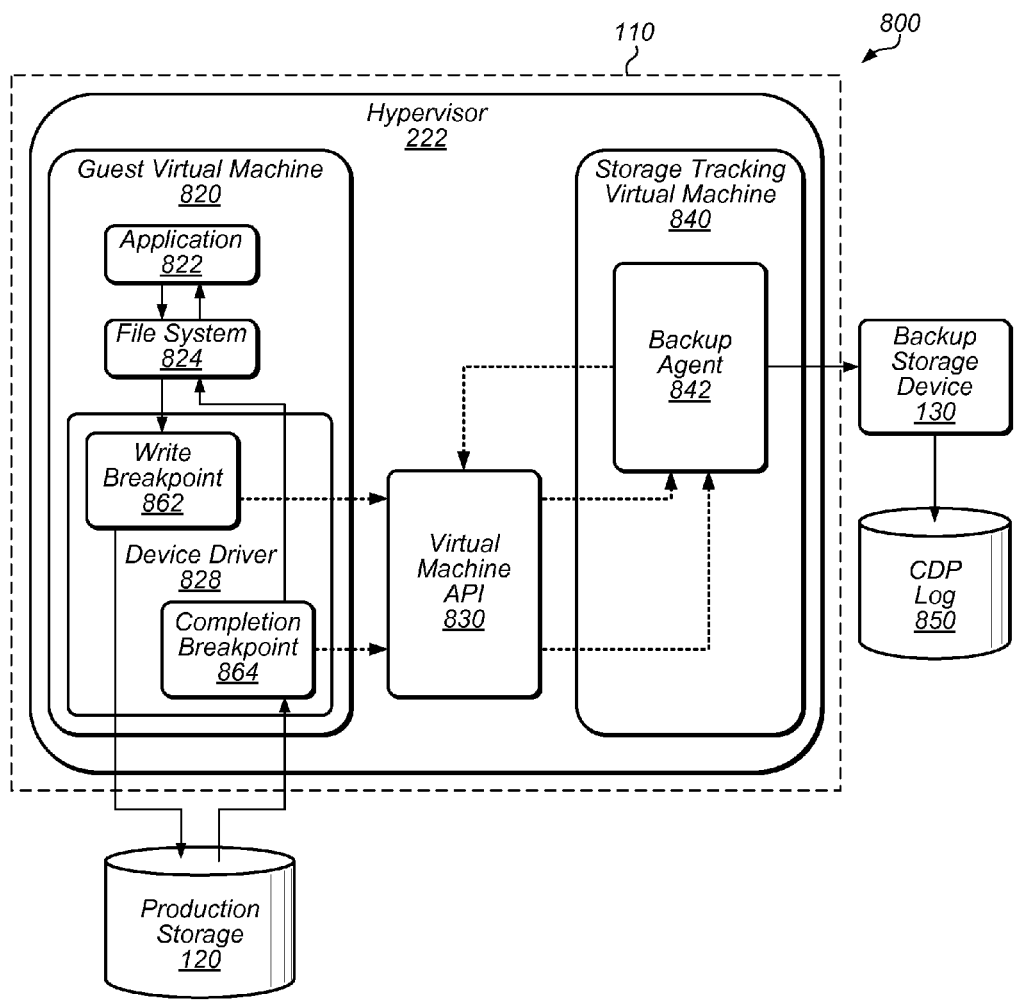
FIG. 8 is a block diagram illustrating one embodiment of a system that tracks storage operations using breakpoints.

Turning now to FIG. 8, a block diagram illustrating one embodiment of a system 800 that tracks storage operations using breakpoints is depicted. As shown, system 800 includes host computer 110, production storage 120, and backup storage device 130. Host computer 110 is configured to execute a hypervisor 222, guest virtual machine 820, and storage tracking virtual machine 840. Guest virtual machine 820 includes an application 822, file system 824, and device driver 828. In the illustrated embodiment, a write breakpoint 862 and completion breakpoint 864 have been inserted into device driver 828. Hypervisor 222 includes code 830 that facilitates one or more APIs. Storage tracking virtual machine 840 includes a backup agent 842. In one embodiment, backup storage device 130 is coupled to a CDP log 850. Many variations to system 800 will be apparent to those skilled in the art.

Application 822, in one embodiment, writes information that is stored by production storage 120 and archived/backed up by backup storage device 130. (The arrows shown in FIG. 8 illustrate the flow of information between blocks within an I/O path of system 800.) In some embodiments, application 822, file system 824, and device driver 828 function in similar manner as application 722, file system 724, and device driver 728 described above in reference to FIG. 7. In the illustrated embodiment of FIG. 8, the I/O path of guest virtual machine 820, however, does not include a filter driver as in FIG. 7.

Instead, backup agent 842, in one embodiment, instructs hypervisor 222, via API 830, to insert a write breakpoint 862 and completion breakpoint 864 into device driver 828 in order to track subsequently-performed write operations. In one embodiment, write breakpoint 862 triggers responsive to guest virtual machine 820 initiating a write operation, and breakpoint 864 triggers responsive to production storage 120 completing that write operation. For example, in one particular embodiment, device driver 828 is a SCSI driver and hypervisor 110 is VMWARE'S ESX SERVER implementing VMWARE'S VMSAFE API. (Device driver 828 may, of course, be any type of device driver. In some embodiments, device driver 828 is a disk device driver such those used for integrated derive electronic (IDE) devices, serial ATA (SATA) devices, etc.). In this example, backup agent 842 may insert write breakpoint 862 (using VMSAFE API) to trigger when the "scsi_strategy" subroutine runs and may insert the completion breakpoint 864 to trigger when the "scsi_done" subroutine runs. In various embodiments, breakpoints 862 and 864 are inserted when guest virtual machine 820 is instantiated. For example, in one embodiment, hypervisor 222 provides an indication to backup agent 842 (e.g., via API 830) when a guest virtual machine 820 is being instantiated. Backup agent 842 may then respond by instructing the hypervisor 222 to insert breakpoints 862 and 864 after the virtual machine 820 has completed its instantiation and before it has started processing write operations.

In one embodiment, hypervisor 222 provides an indication, to backup agent 842, that guest virtual machine 820 is performing a write operation by indicating that breakpoint 862 has triggered. Hypervisor 222 may also stop execution of guest virtual machine 820. In one embodiment, backup agent 842 then captures information about the write operation from an I/O buffer of guest virtual machine 820. (As defined herein, I/O buffer refers to a portion of memory within a guest virtual machine 112 that stores information that is usable in the performance of a write operation.) In some embodiments, the I/O buffer is located within the operating system of guest virtual machine 820. As noted above, this information may include the data being written and any other metadata. In some embodiments, agent 842 may store this information in a buffer prior to transmitting it to backup storage device 130. Once agent 842 has finished capturing information, agent 842 may instruct hypervisor 222 to restart execution of guest virtual machine 820 allowing it continue performing the write operation.

In one embodiment, hypervisor 222 provides another indication, to agent 842, that the write operation has been completed by indicating that completion breakpoint 864 has triggered. In some embodiments, in response to receiving such an indication, agent 842 may capture various metadata regarding the write operation. Agent 842 may also communicate information about the write operation to backup storage device 130, such as described above in conjunction with FIG. 7.

In some instances, system 800 may have certain advantages. As opposed to the embodiment of FIG. 7, for example, no program instructions (e.g., those of filter driver 726) need to be inserted into guest virtual machine 820 (e.g., during initialization of 820) and executed. Thus, system 800 is easily scalable to operate with multiple executing guest virtual machines. Additionally, in some instances, guest virtual machines 820 may not need any extra administration steps, and backup of instantiated virtual machines 820 may be performed automatically.

System 800 is described in more detail below in conjunction with FIGS. 9C and 12.

Figure 9A:
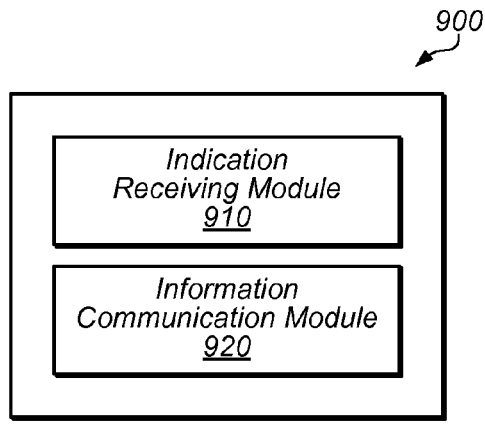
FIG. 9A is a block diagram illustrating one embodiment of various modules within memory of a host computer for tracking storage operations of a guest virtual machine.

Turning now to FIG. 9A, a block diagram of various modules within a memory 900 of host computer 110 is depicted. Memory 900 may be any suitable type of memory, including those described in FIGS. 2 and 5. As shown, memory 900 includes an indication receiving module 910 and information communication module 920. In one embodiment, modules 910 and 920 include program instructions executable by host computer 110 to track storage operations of guest virtual machines 112 using a storage tracking virtual machine 116. In one embodiment, modules 910 and 920 are located within a portion of memory 900 that is allocated to an instance of a storage tracking virtual machine 116.

Indication receiving module 910, in one embodiment, includes program instructions that executable to receive, at a storage tracking virtual machine 116 executing on host computer 110, an indication that a guest virtual machine 212 executing on host computer 110 is performing a write operation to production storage 120. In some embodiments, module 910 may execute to receive the indication from a filter driver (e.g., filter driver 726 in FIG. 7) via an inter-virtual machine communication interface 114, where the indication includes information about the write operation such as the data being written and corresponding metadata (such as that described above). In other embodiments, module 910 may execute to receive the indication from a hypervisor (e.g., hypervisor 222) in response to a breakpoint (e.g., write breakpoint 862) triggering. In some embodiments, indication receiving module 910 may further include program instructions that are executable, in response to the received indication, to capture an I/O buffer of the guest virtual machine to obtain information about the write operation.

Information communication module 920, in one embodiment, includes program instructions that are executable to communicate information about the write operation from storage tracking virtual machine 116 to backup storage device 130. In one embodiment, module 920 may execute to communicate information about the write operation as soon as module 910 receives information about the write operation. In some embodiments, module 920 may execute to communicate information about the write operation once production storage 120 has completed performing the write operation. In various embodiments, module 920 may execute to buffer information about multiple write operations and communicate the buffered information of multiple completed write operations to backup storage device 130 in a single update. In one embodiment, module 920 may execute to indicate in the buffer whether a given write operation has completed or not. For example, module 920 may set a bit of an entry for a write operation if that write operation has been completed by production storage 120.

The operation of modules 910 and 920 is described next in conjunction with FIGS. 9B and 9C.

Figure 9B:
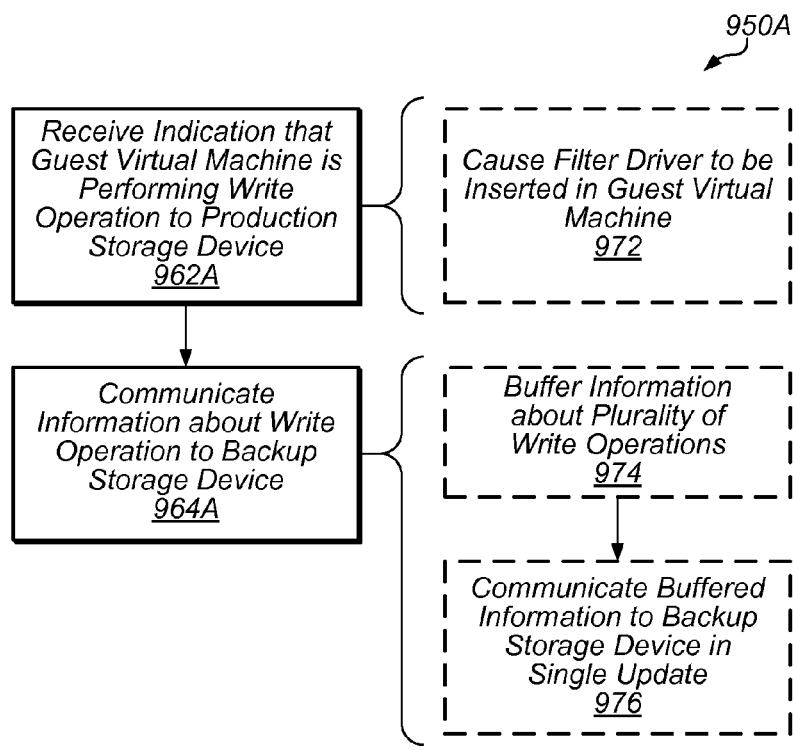
FIG. 9B is a flow diagram illustrating one embodiment of a method for tracking storage operations of a guest virtual machine.

Turning now to FIG. 9B, one embodiment of a method 950A for tracking storage operations of a guest virtual machine is depicted. In one embodiment, storage tracking virtual machine 116 performs method 950A after guest virtual machine 112 initiates performance of a write operation. In other embodiments, (e.g., when performing substep 972), storage tracking virtual machine 116 may begin performing method 950A as a guest virtual machine 112 is being initialized. In some embodiments, storage tracking virtual machine 116 may perform multiple instantiations of method 950A in parallel for multiple guest virtual machines 112. As shown, method 950A includes steps 952A and 954A. In some embodiments, steps 952A and 954A may be performed using one or more of the substeps 972-976 (shown on the right with dotted lines).

In step 962A, storage tracking virtual machine 116 (e.g., using module 910) receives an indication that a guest virtual machine 112 is performing a write operation to production storage 120. As noted above, storage tracking virtual machine 116, in some embodiments, may receive this indication from a filter driver (e.g., filter driver 726). In one embodiment, storage tracking virtual machine 116, in substep 972, causes a filter driver to be inserted in the guest virtual machine 112 (e.g., during initialization of guest virtual machine 112), where the filter driver includes program instructions that, when executed, conveys the indication via a shared memory of an inter-virtual machine communication interface (e.g., interface 730). In some embodiments, the filter driver is resident in the I/O path of guest virtual machine 112, where the driver is situated to receive write operations from a file system (e.g., file system 724) of the guest virtual machine and directed to production storage 130. For example, the filter driver may receive an indication of a write operation, forward the indication to a device driver (e.g., device driver 728) associated with production storage 120, and provide a copy of the indication to storage tracking virtual machine 116.

In step 964A, storage tracking virtual machine 116 (e.g., using module 920) communicates information about the write operation to backup storage device 130. In one embodiment, storage tracking virtual machine 116 may communicate information about the write operation as soon as it receives such information. For example, storage tracking virtual machine 116 may forward information contained within the received indication to backup storage device 130 as soon as virtual machine 116 receives the indication from the filter driver. In some embodiments, storage tracking virtual machine 116 may communicate information about the write operation once the write operation has been completed by production storage 120. For example, the filter driver may provide, to storage tracking virtual machine 116, a second indication that the write operation has been completed by production storage 120. In one embodiment, storage tracking virtual machine 116, in step 974, buffers information about multiple write operations. In some embodiments, storage tracking virtual machine 116 may indicate, for each entry of information about a write operation, whether that write operation has completed or not by setting a bit in an entry if that write operation has completed. In step 976, storage tracking virtual machine, in one embodiment, communicates buffered information of completed write operations in a single update to backup storage device 130. For example, as noted above, storage tracking virtual machine 116 may batch this information at regular time intervals, after a predetermined number of write operations have completed, once a buffer storing this information exceeds a specified capacity, etc. In some embodiments, storage tracking virtual machine 116 may indicate, to the filter driver, when each write operation has been archived/backed up by backup storage device 130. In some embodiments, the filter driver may indicate a write completion to the application, even while the filter driver has not yet received the indication from the storage tracking virtual machine 116, which, in some instances, may improve application write latency.

Method 950A may of course be performed differently in other embodiments. An alternative embodiment of method 950A is described next.

Figure 9C:
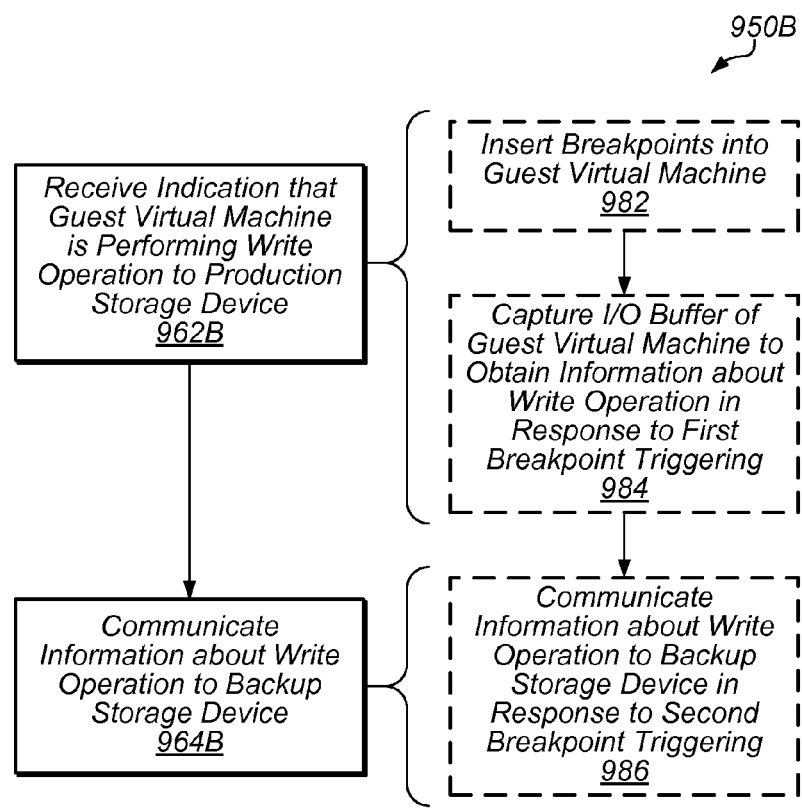
FIG. 9C is a flow diagram illustrating another embodiment of a method for tracking storage operations of a guest virtual machine.

Turning now to FIG. 9C, another embodiment of a method 950B for tracking storage operations of a guest virtual machine is depicted. As with method 950A, storage tracking virtual machine 116, in one embodiment, performs method 950B after guest virtual machine 112 initiates performance of a write operation. In other embodiments, (e.g., when performing substep 982), storage tracking virtual machine 116 may begin performing method 950B once a guest virtual machine 112 has been initialized. In some embodiments, storage tracking virtual machine 116 may perform multiple instantiations of method 950B in parallel for multiple guest virtual machines 112. As shown, method 950B includes steps 952B and 954B. In some embodiments, steps 952B and 954B may be performed using one or more of the substeps 982-986 (shown on the right with dotted lines).

In step 962B, storage tracking virtual machine 116 (e.g., using module 910) receives an indication that a guest virtual machine 112 is performing a write operation to production storage 120. As noted above, storage tracking virtual machine 116, in some embodiments, may receive this indication from a hypervisor (e.g., hypervisor 222) by performing substeps 982 and 984.

In substep 982, storage tracking virtual machine 116, in one embodiment, inserts breakpoints (e.g., breakpoints 862 and 864) into a guest virtual machine 112 when that guest virtual machine 112 is being initialized. In one embodiment, storage tracking virtual machine 116 inserts a breakpoint (e.g., write breakpoint 862) into a subroutine or other code (e.g., of device driver 828) that executes when the guest virtual machine 112 initiates a write operation such that the breakpoint triggers when that subroutine executes. In some embodiments, storage tracking virtual machine 116 may also insert a breakpoint (e.g., completion breakpoint 864) into a subroutine (e.g., of device driver 828) that executes after production storage 120 has completed the write operation, where the breakpoint triggers if that subroutine is executed. In various embodiments, storage tracking virtual machine 116 inserts breakpoints using an API of a hypervisor (e.g., API 830 of hypervisor 222).

In substep 984, storage tracking virtual machine 116, in one embodiment, captures an I/O buffer of a guest virtual machine 112 to obtain information about a write operation in response to the first break point (e.g., write breakpoint 862) triggering. In some embodiments, a hypervisor has stopped execution of the guest virtual machine 112 once the breakpoint triggers. In one embodiment, storage tracking virtual machine 116 captures, via an API (e.g., API 830) of the hypervisor, information from an I/O buffer of the guest virtual machine 112, where the information may include the data being written and any corresponding metadata. In one embodiment, storage tracking virtual machine 116 may instruct the hypervisor to resume execution of the guest virtual machine 112 once the storage tracking virtual machine has completed capturing information.

In step 964B, storage tracking virtual machine 116 (e.g., using module 920) communicates information about the write operation from the storage tracking virtual machine to backup storage device 130. In one embodiment, storage tracking virtual machine 116 communicates this information once it has been captured from the guest virtual machine 112. In other embodiments, storage tracking virtual machine 116 communicates the information once the write operation has completed, such as in substep 986.

In substep 986, storage tracking virtual machine 116, in one embodiment, communicates information about the write operation to backup storage device 130 in response to the second breakpoint (e.g., breakpoint 864) triggering indicating that production storage 120 has completed the write operation. In some embodiments, storage tracking virtual machine 116 buffers information about multiple write operations, and stores, for each write operation, an indication in the buffer of whether that write operation has completed or not. In one embodiment, storage tracking virtual machine 116 communicates information about the completed write operations in single update to backup storage device 130 (such as described in substeps 974 and 976 above).

In various embodiments, storage tracking virtual machine 116 and/or guest virtual machine 112 may be instantiated (e.g., during startup of host computer 110) by executing program instructions that are stored in a memory such as described below.

Figure 10A:
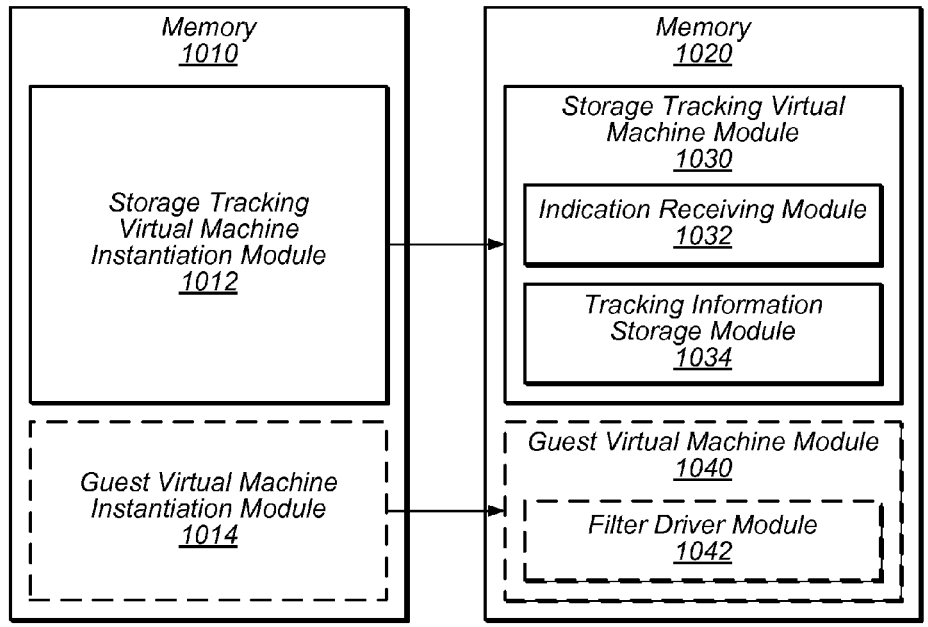
FIG. 10A is a block diagram illustrating one embodiment of various modules within a memory for instantiating a storage tracking virtual machine and/or a guest virtual machine.

Turning now to FIG. 10A, a block diagram of various modules for instantiating a storage tracking virtual machine and/or a guest virtual machine is depicted. In one embodiment, memory 1010 is a computer-readable storage medium that includes program instructions that are executable (e.g., during a start-up process of host computer 110) to store modules of program instructions onto memory 1020. As shown, memory 1010 includes a storage tracking virtual machine instantiation module 1012. In some embodiments (as indicated by the dotted line), memory 1010 also includes a guest virtual machine instantiation module 1014. Memories 1010 and 1020 may be any suitable type of memory, including those described above in conjunction with FIGS. 2 and 5.

Storage tracking virtual machine instantiation module 1012, in one embodiment, includes program instructions that are executable to instantiate a storage tracking virtual machine module 1030 in memory 1020, where, after instantiation, module 1030 includes indication receiving module 1032 and tracking information storage module 1034. In one embodiment, module 1030 includes program instructions that are executable to implement a storage tracking virtual machine 116. In one embodiment, module 1032 includes program instructions that are executable to receive a first indication that a guest virtual machine 112 is performing a write operation to a production storage device (e.g., device 310). In one embodiment, module 1034 includes program instructions that are executable to store tracking information about the write operation to a backup storage device 130. In various embodiments, modules 1032 and/or 1034 may be similar to modules 910 and 920 described above.

Guest virtual machine instantiation module 1014, in one embodiment, includes program instructions that executable to instantiate a guest virtual machine module 1040 that includes program instructions that are executable to implement a guest virtual machine 112. In some embodiments, module 1040 includes a filter driver module 1042 that includes program instructions that are executable to implement a filter driver such as described above (e.g., filter driver 726).

In various embodiments, modules 1012 and 1014 may be copied to memory 1010 during an installation process of host computer 110 that configures computer 110 to execute one or more storage tracking virtual machines 116 and/or one or more guest virtual machines 112. For example, a user of host computer 110 may install modules 1012 and 1014 by downloading them from a network, copying them from a removable storage medium, etc.

The operations of modules 1012 and 1014 are described next in conjunction with FIG. 10B.

Figure 10B:
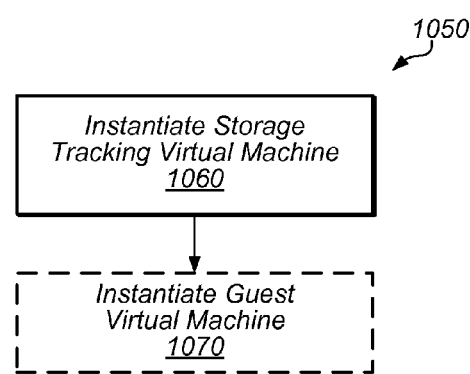
FIG. 10B is a flow diagram illustrating one embodiment of a method implemented by a host computer for instantiating a storage tracking virtual machine and/or a guest virtual machine.

Turning now to FIG. 10B, a method 1050 for instantiating a storage tracking virtual machine and/or a guest virtual machine is depicted. In one embodiment, host computer 110 performs method 1050 during host computer's 110 boot-up process. In some embodiments, method 1050 may (or may not) include performing step 1070, as indicated by the dotted line.

In step 1060, host computer 110 (e.g., using module 1012) instantiates a storage tracking virtual machine 116 on host computer 110 (e.g., module 1030 in memory 1020), where, after instantiation of the storage tracking virtual machine 116, the storage tracking virtual machine includes a first set of program instructions executable by host computer 110 to receive (e.g., using module 1032) a first indication that a guest virtual machine 112 executing on host computer 110 is performing a write operation to a production storage device 310 and to store (e.g., using module 1034) tracking information about the write operation to a backup storage device 130.

In step 1070, host computer 110 (e.g., using module 1014) instantiates the guest virtual machine 112 (e.g., module 1040 in memory 1020), where after instantiation of the guest virtual machine, the guest virtual machine 112 includes program instructions of a filter driver (e.g., module 1042). In one embodiment, the program instructions of the filter driver are executable to provide the first indication via an inter-virtual machine communication interface (e.g., interface 114) and to provide a second indication to the storage tracking virtual machine 116 via the inter-virtual machine communication interface, where the second indication is that the write operation has completed. In some embodiments, the instance of the storage tracking virtual machine 116 may further include program instructions executable to store the information about the write operation after receiving the second indication. In various embodiments, host computer 110 may repeatedly perform step 1070 in order to instantiate multiple guest virtual machines 112.

Embodiments of methods that combine steps from methods 950 and 1050 are described next.

Figure 11:
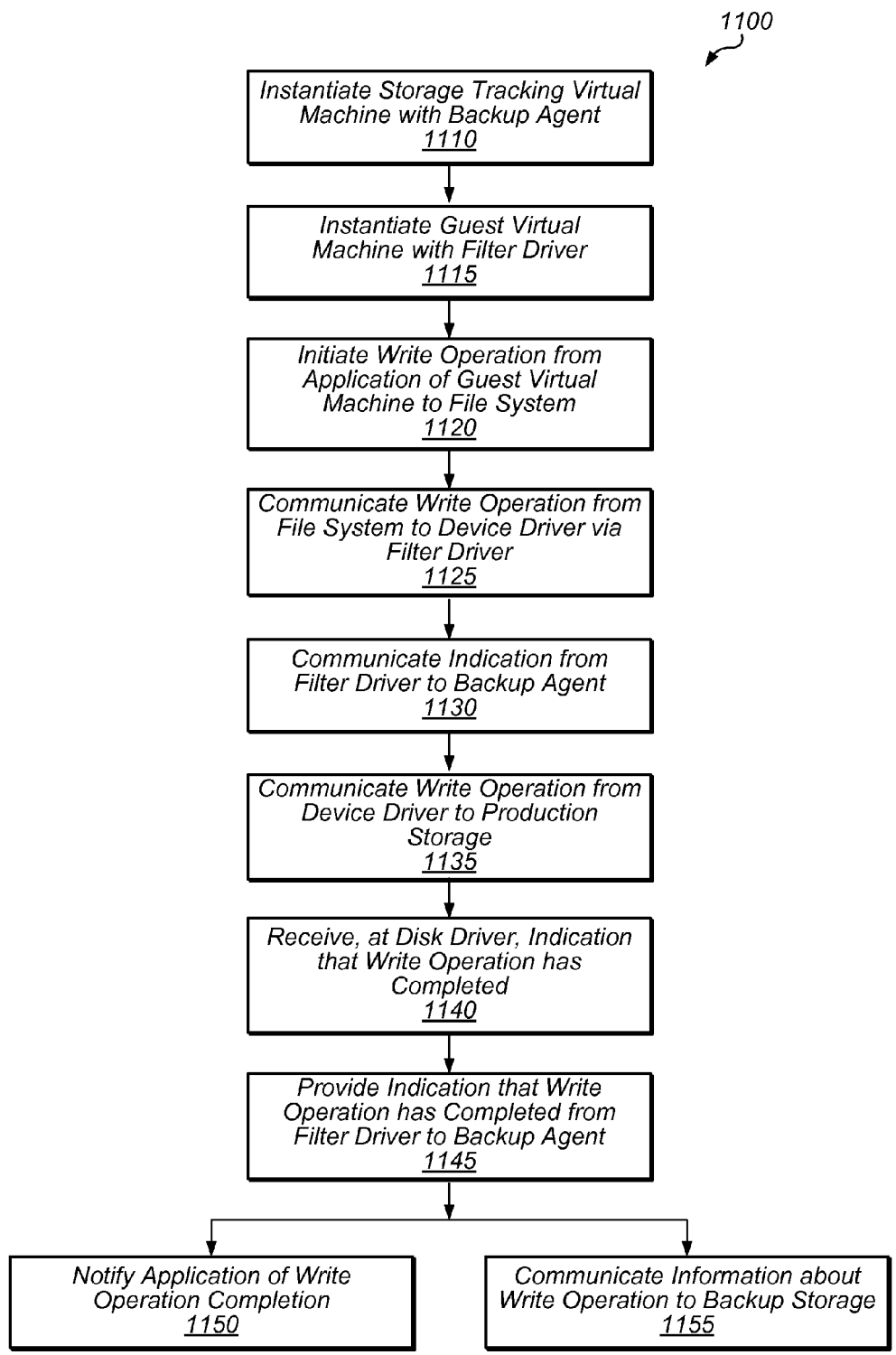
FIG. 11 is a flow diagram illustrating one embodiment of a method implemented by a host computer system for tracking storage operations of a guest virtual machine using a filter driver.

Turning now to FIG. 11, one embodiment of a method 1100 implemented by host computer 110 for tracking storage operations of a guest virtual machine 112 using a filter driver is depicted. In various embodiments, host computer 110 may be implemented within a backup system such as system 700 described above in reference to FIG. 7. As a result, various steps in method 1100 may be performed by elements described in FIG. 7. In one embodiment, host computer 110 begins performing method 1100 during system boot up. In some embodiments, various steps of method 1100 may be performed in parallel (or substantially parallel) such as steps 1110 and 1120. Variations to method 1100 will be apparent to those skilled in the art.

In step 1110, host computer 110 instantiates a storage tracking virtual machine 116, including a backup agent (e.g., backup agent 742). For example, host computer 110 may execute a storage tracking virtual machine instantiation module (e.g., module 1012) that places a storage tracking virtual machine module (e.g. module 1030) in a memory (e.g., memory 1020) of host computer 110. In some embodiments, the storage tracking virtual machine instantiation module may be placed into a memory (e.g., memory 1010) when a user of host computer 110 performs an installation process that configures computer 110 to track storage operations of virtual machines using a filter driver.

In step 1115, host computer 110 instantiates a guest virtual machine 112 having a filter driver (e.g., filter driver 726). For example, host computer 110 may execute a guest virtual machine instantiation module (e.g., module 1014) that places a guest virtual machine module (e.g. module 1040) in a memory (e.g., memory 1020) of host computer 110. In some embodiments, the guest virtual machine instantiation module may be placed into a memory (e.g., memory 1010) during an installation process.

In step 1120, host computer 110 initiates a write operation from an application (e.g., application 722) of the guest virtual machine to a file system (e.g., file system 724). For example, the application might write to a file in a directory within the file system.

In step 1125, host computer 110 communicates the write operation from the file system to a device driver (e.g., device driver 728) via the filter driver. In one embodiment, the filter driver code is inserted into the guest virtual machine 112 when it is instantiated such that the filter driver executes to monitor communications between the file system and the device driver.

In step 1130, host computer 110 communicates an indication of the write operation from the filter driver to the backup agent. For example, in some embodiments, as information about the write operation passes through the filter driver, the filter driver may provide an indication of the write operation, to the backup agent, that includes this information. In one embodiment, the filter driver communicates the indication through a shared memory of an inter-virtual machine communication interface (e.g., interface 730).

In step 1135, host computer 110 communicates the write operation from a device driver (e.g., device driver 728) to production storage 120. For example, the disk drive may provide instructions to one or more production storage devices 310 to perform the write operation.

In step 1140, host computer 110 receives, at the device driver of the guest virtual machine 112, an indication that the write operation has completed.

In step 1145, host computer 110 provides an indication that the write operation has completed from the filter driver to the backup agent. In one embodiment, the filter driver provides this indication through the shared memory of the inter-virtual machine communication interface (e.g., interface 730).

In step 1150, the file system of host computer 110 notifies the application of the write operation completion.

In step 1155, host computer 110 communicates information about the write operation to backup storage device 130. As noted above, the backup agent (e.g., agent 742) of the storage tracking virtual machine 116 may communicate information about the write operation to backup storage device 130 upon receipt of an indication that the write operation has been completed by production storage 120. Alternatively, the backup agent may wait and subsequently communicate information about multiple completed write operations in a single update to backup storage device 130. As further noted above, the backup agent may batch this information at regular time intervals, after a predetermined number of write operations have completed, once a buffer storing this information exceeds a specified capacity, etc. In various embodiments, the backup agent may provide the filter driver with a confirmation once the agent has communicated information for one or more write operations to device 130.

Another embodiment of method for tracking storage operations is described next.

Figure 12:
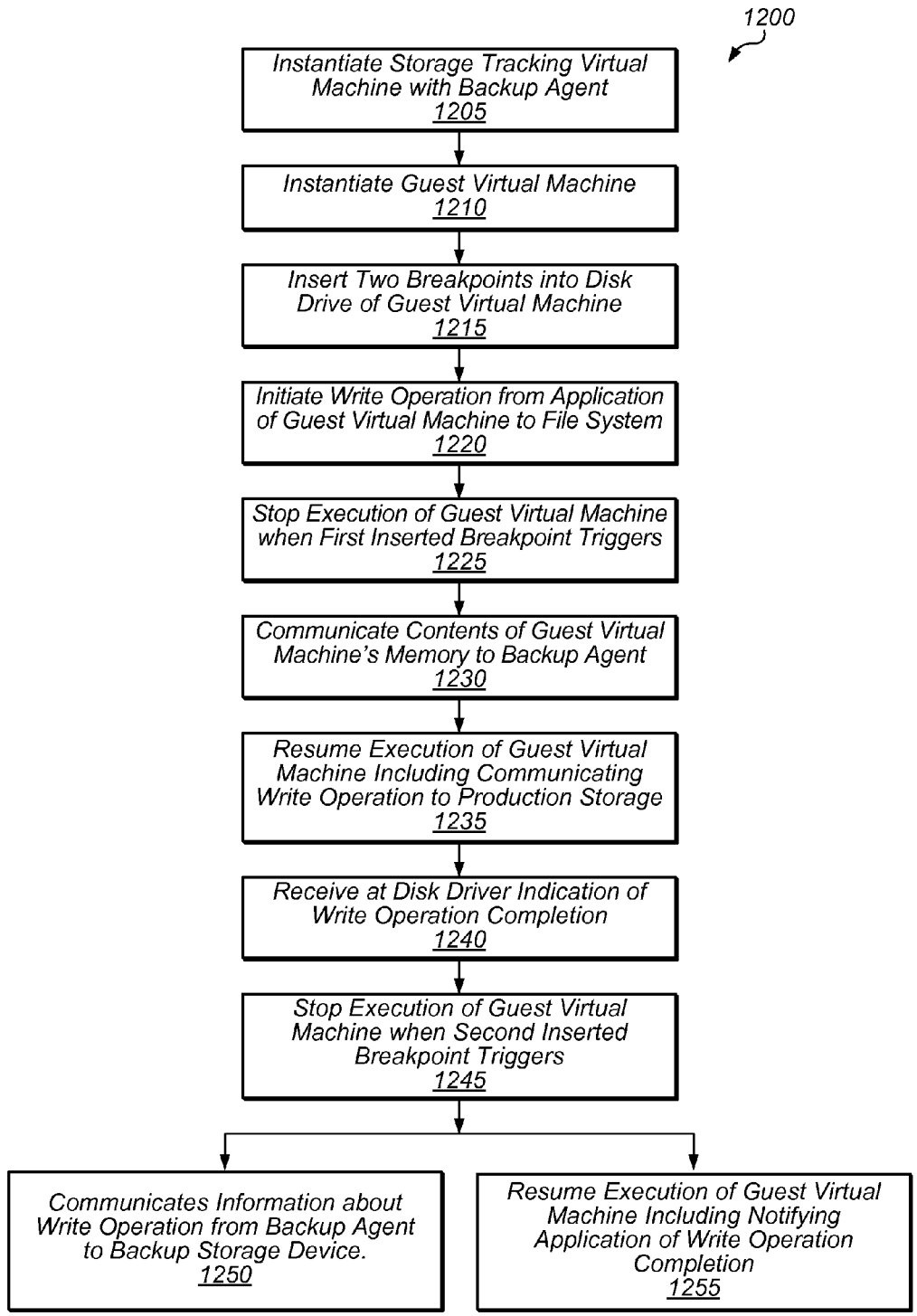
FIG. 12 is a flow diagram illustrating one embodiment of a method implemented by a host computer for tracking storage operations of a guest virtual machine using breakpoints.

Turning now to FIG. 12, one embodiment of a method 1200 implemented by host computer 110 for tracking storage operations of a guest virtual machine 112 using breakpoints is depicted. In various embodiments, host computer 110 may be implemented within a backup system such as system 800 described above in reference to FIG. 8; thus various steps may refer to elements described in FIG. 8. In one embodiment, host computer 110 begins performing method 1200 during system boot up. In some embodiments, various steps of method 1200 may be performed in parallel (or substantially parallel) such as steps 1205 and 1210. Variations to method 1200 will be apparent to those skilled in the art.

In step 1205, host computer 110 instantiates storage tracking virtual machine 116, including a backup agent (e.g., backup agent 842). For example, as noted above, host computer 110 may execute a storage tracking virtual machine instantiation module (e.g., module 1012) that places a storage tracking virtual machine module (e.g. module 1030) in a memory (e.g., memory 1020) of host computer 110. In some embodiments, the storage tracking virtual machine instantiation module may be placed into a memory (e.g., memory 1010) when a user of host computer 110 performs an installation process that configures computer 110 to track storage operations of virtual machines using breakpoints.

In step 1210, host computer 110 instantiates a guest virtual machine 1210. For example, host computer 110 may execute a guest virtual machine instantiation module (e.g., module 1014) that places a guest virtual machine module (e.g. module 1040) in a memory (e.g., memory 1020) of host computer 110. In some embodiments, the guest virtual machine instantiation module may be placed into a memory (e.g., memory 1010) during an installation process.

In step 1215, host computer 110 inserts two breakpoints into a device driver of the guest virtual machine 112. In one embodiment, a first breakpoint is inserted into a subroutine of the device driver that executes when a write operation is initiated by guest virtual machine 112—e.g., the "scsi_strategy" subroutine in a SCSI device driver.

In one embodiment, the second breakpoint is inserted into a subroutine of the device driver that executes once the write operation has been completed by production storage 120—e.g., the "scsi_done" subroutine in a SCSI device driver. In various embodiments, the storage tracking virtual machine 116 inserts the two breakpoints when a guest virtual machine 112 is instantiated, by providing instructions to the hypervisor 222 (e.g., via API 830) to insert the breakpoints.

In step 1220, host computer 110 initiates a write operation from an application (e.g., application 822) of the guest virtual machine 112 to a file system (e.g., file system 824) of virtual machine 112. For example, the application might write to a file in a directory within the file system.

In step 1225, host computer 110 stops execution of guest virtual machine 112 when the first inserted breakpoint (e.g., write breakpoint 862) triggers indicating that a write operation has been initiated by the guest virtual machine 112.

In step 1230, host computer 110 communicates contents of guest virtual machine 112's memory to the backup agent. For example, in one embodiment, the backup agent provides a request to an API of a hypervisor (e.g., API 830 of hypervisor 222), where the request is to capture information about the write operation from an I/O buffer of the guest virtual machine 112.

In step 1235, host computer 110 resumes execution of the guest virtual machine 112. Upon resumption, guest virtual machine 112 resumes communicating the write operation to production storage 120. In one embodiment, the backup agent may instruct a hypervisor of host computer 110 to resume execution of the guest virtual machine 112 once agent 842 has completed capturing the I/O buffer.

In step 1240, host computer 110 receives, at a device driver (e.g., device driver 828) of the guest virtual machine 112, an indication that the write operation has been completed by production storage 120.

In step 1245, host computer 110 stops execution of the guest virtual machine 112 when the second inserted breakpoint triggers indicating, to the backup agent, that the write operation has been completed. In some embodiments, in response to the second breakpoint triggering, the agent captures metadata information (e.g., size and location, etc.) about the write operation from the I/O buffer.

In step 1250, host computer 110 communicates information about the write operation from the backup agent to backup storage device 130. In some embodiments, step 1250 may be performed in a similar manner as step 1155 described above—i.e., the backup agent may communicate information about the write operation upon receipt of an indication that the write operation has been completed, or alternatively, the backup agent may wait and subsequently communicate information about multiple completed write operations in a single update to backup storage device 130.

In step 1255, host computer 110 resumes execution of guest virtual machine 112, where, upon resumption, machine 112 notifies the application of the write operation completion.

Various embodiments described above refer to a system 100 having a host computer 110 that tracks storage operations performed by guest virtual machines 112. Although computer 110 has been described within the context of tracking storage operations, embodiments of the present disclosure may also be applicable to other systems that need to that need to track other types of operations performed by virtual machines. Accordingly, embodiments of the present disclosure are not solely applicable to systems that track storage operations of virtual machines but rather any devices that implement virtual machines.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium having program instructions stored thereon that are executable by a computer system to cause the computer system to perform operations comprising:
   initializing a driver in a guest virtual machine hosted by a hypervisor executing on the computer system;
   receiving, at a storage tracking virtual machine hosted by the hypervisor, an indication that the guest virtual machine is performing a write operation to a first storage device, wherein the indication is received from the driver;
   communicating information about the write operation from the storage tracking virtual machine to a second storage device.

2. The computer-readable storage medium of claim 1, wherein the communicated information includes a block of data being written by the write operation and metadata about the block.

3. The computer-readable storage medium of claim 1, wherein, in response to the write operation being performed, the driver conveys the indication received by the storage tracking virtual machine via a shared memory of an inter-virtual machine communication interface.

4. The computer-readable storage medium of claim 1, the operations further comprising:
   buffering, at the storage tracking virtual machine, information about the write operation and one or more other write operations being performed by one or more guest virtual machines executing on the computer system; and
   communicating the buffered information from the storage tracking virtual machine to the second storage device in a single update.

5. A method comprising:
   a storage tracking virtual machine hosted by a hypervisor on a computer system receiving tracking information about a write operation being performed to a first storage device, wherein the write operation is initiated by a guest virtual machine hosted by the hypervisor, wherein the tracking information is received from a driver in the guest virtual machine;
   the storage tracking virtual machine communicating the tracking information to a second storage device.

6. The method of claim 5, wherein the tracking information includes a block of data being written and metadata about the block.

7. The method of claim 5, further comprising:
   in response to the guest virtual machine initiating the write operation:
      the storage tracking virtual machine stopping execution of the guest virtual machine; and
      the storage tracking virtual machine receiving the tracking information by examining a predetermined portion of memory used by the guest virtual machine to perform the write operation.

8. The method of claim 7, wherein said stopping includes causing an insertion of a breakpoint into the driver that enables the guest virtual machine to perform write operations to the first storage device.

9. The method of claim 5, wherein the driver conveys the tracking information to the storage tracking virtual machine by storing the tracking information in a memory location that is accessible by both the guest virtual machine and the storage tracking virtual machine.

10. The method of claim 5, further comprising:
    prior to said communicating, the storage tracking virtual machine receiving an indication that the performance of the write operation has completed successfully; and
    in response to receiving the indication, the storage tracking virtual machine communicating the tracking information to the second storage device.

11. The method of claim 10, where the storage tracking virtual machine communicates the tracking information in a single update with tracking information about write operations being performed by a plurality of other guest virtual machines.

12. A non-transitory computer-readable storage medium having program instructions stored thereon that are executable by a computer system to perform operations comprising:
    instantiating a storage tracking virtual machine on a hypervisor of the computer system, wherein, after instantiation of the storage tracking virtual machine, the storage tracking virtual machine includes a first set of program instructions executable by the computer system to:
       receive, from a first driver of a first guest virtual machine running on the hypervisor, a first indication that the first guest virtual machine is performing a write operation to a production storage device;
       receive, from a second driver of a second guest virtual machine running on the hypervisor, a second indication that the second guest virtual machine is performing a write operation to a production storage device; and
       store tracking information about the write operations to a backup storage device.

13. The computer-readable storage medium of claim 12, wherein the first and second guest virtual machines implement different system platforms.

14. The computer-readable storage medium of claim 12, the operations comprising:
    instantiating the first guest virtual machine, wherein after instantiation of the first guest virtual machine, the first guest virtual machine includes program instructions of the first driver that are executable to:

provide the first indication via an inter-virtual machine communication interface; and provide a third indication to the storage tracking virtual machine via the inter-virtual machine communication interface, wherein the third indication is that the write operation has completed;

wherein the storage tracking virtual machine further includes program instructions executable to store the information about the write operation of the first guest virtual machine to the backup storage device after receiving the third indication.

15. The computer-readable storage medium of claim 14, wherein the storage tracking virtual machine further includes program instructions executable to indicate, to the first driver, that the storage tracking virtual machine has completed storing the information about the write operation of the first guest virtual machine to the backup storage device.

16. The computer-readable storage medium of claim 12, the operations comprising:

in response to the first guest virtual machine initiating the write operation, causing the hypervisor of the computer system to stop execution of the first guest virtual machine and to initiate execution of the storage tracking virtual machine, wherein the storage tracking virtual machine further includes program instructions executable to obtain the information about the write operation of the first guest virtual machine by accessing a predetermined memory location used by the first guest virtual machine during performance of the write operation.

17. The computer-readable storage medium of claim 12, wherein the storage tracking virtual machine further includes program instructions to store the information about the write operation in a buffer with information about one or more other write operations, and wherein the storage tracking virtual machine further includes program instructions executable to indicate in the buffer whether a given write operation has been completed.

* * * * *